United States Patent [19]
Costa

[11] Patent Number: 5,934,541
[45] Date of Patent: *Aug. 10, 1999

[54] DUAL INTERMITTENT MICROFLAME SYSTEM FOR DISCRETE POINT SOLDERING

[76] Inventor: Larry J. Costa, 54201 Ash Rd., Osceola, Ind. 46561

[ * ] Notice: This patent is subject to a terminal disclaimer.

[21] Appl. No.: 08/904,896

[22] Filed: Aug. 1, 1997

[51] Int. Cl.$^6$ .............................. B23K 35/00; B23K 5/22; F23D 14/82
[52] U.S. Cl. ...................... 228/44.3; 228/47.1; 431/346; 48/192
[58] Field of Search .............................. 228/902, 6.1, 6.2, 228/47.1, 44.3; 431/121, 436; 48/192

[56] References Cited

U.S. PATENT DOCUMENTS

| 3,957,618 | 5/1976 | Spirig | 204/270 |
|---|---|---|---|
| 4,113,601 | 9/1978 | Spirig | 204/230 |
| 4,206,029 | 6/1980 | Spirig | 204/228 |
| 4,336,122 | 6/1982 | Spirig | 204/222 |
| 5,169,053 | 12/1992 | Rochat | 445/45 |
| 5,827,053 | 10/1998 | Costa | 431/121 |

OTHER PUBLICATIONS

SPIRIG Brochure "The SPIRFLAME®", Undated.

Primary Examiner—Patrick Ryan
Assistant Examiner—Kiley Stoner
Attorney, Agent, or Firm—Zarley, McKee, Thomte, Voorhees & Sease; Dennis L. Thomte

[57] ABSTRACT

A dual intermittent microflame system for discrete point soldering comprising first and second gas valves which are each connected to a source of combustible gas and a source of non-combustible gas. A flashback arrestor is imposed between each of the gas valves and the sources of combustible gas. A pair of gas lines connect the gas outlets of the first and second gas valves to first and second microflame nozzle tips which have ignition electrodes position adjacent thereto for igniting the nozzle tips. A workpiece holder is positioned adjacent the nozzle tips for positioning a workpiece adjacent thereto so that the tips are able to solder a pair of solder points.

7 Claims, 6 Drawing Sheets

DUAL INTERMITTENT MICROFLAME SYSTEM FOR DISCRETE POINT SOLDERING

BACKGROUND OF THE INVENTION

1. Field of the Invention

This invention relates to a dual intermittent microflame system for discrete point soldering and more particularly to a dual intermittent microflame system for discrete point soldering including a positive flow purge system to prevent flashback of combustible gas and oxygen.

2. Description of the Prior Art

Microflame soldering is well-known in the art and the requirements and technology therefore are disclosed in U.S. Pat. No. 5,169,053. In addition, see also U.S. Pat. Nos. 3,957,618; 4,113,601; 4,206,029; and 4,336,122. Generally speaking, many microflame systems such as illustrated in FIG. 1 include a generator which generates combustible gas which is delivered to a booster system for lowering the flame temperature, with the booster being connected to one or more torches. Most microflame soldering systems utilize a combustible gas mixture of hydrogen and oxygen. The mixture of hydrogen and oxygen will burn within the supply hoses if ignited. Normally, the flame at the nozzle tip does not ignite the combustible gas within the supply hoses because the combustible gas pressure is maintained by its supply, thereby preventing the flame from travelling back from the flame nozzle tip into the gas supply hose. Flashback is initiated from the flame nozzle tip when the external flame travels back into the gas supply hose when the gas pressure lowers as it exits the open flame nozzle tip.

The requirements in technology for high speed discrete point soldering, as disclosed in U.S. Pat. No. 5,169,053, have been established since the middle 1980s. The constraints of this technology have also been established with respect to cost, physical size and space required for the flame tip to swing into position, variability in heating and operator setup. With respect to cost, a conventional rotary microflame system generally consists of a gas supply, electrical gas valve, control system, flashback protection device, pneumatic rotary actuator, pneumatic pressure regulator, pneumatic flow controls, electronic pneumatic actuation valve, a pair of rotary travel stops, a pair of electrical rotary position sensors, timing belt drive, housing, rotary flame tip holder, and flame tip nozzle.

The physical size of the conventional rotary microflame housing is determined by the size of the rotary flame tip and is rotary actuated. The relatively large actuator size can prohibit access to some of the components to be soldered. In addition, other adjacent components are sometimes sensitive to the heat of the microflame as it is rotated into position to heat the parts to be soldered.

Heating of the parts to be soldered is affected by the actual time the flame is directed at the part. The pneumatic rotary actuator is affected by air pressure, air lubrication, pneumatic flow control, and the condition of the rotary actuator.

Control of the pneumatic rotary actuator of the prior art is critical because of the significant time it takes to apply heat to (400 milliseconds) and redirect heat (400 milliseconds) from the point to be soldered compared to the relatively short overall cycle time (900 milliseconds). With this rapid cycle time, the operator usually makes the corrections on a trial and test basis.

In the closed loop temperature based prior art systems, after the cycle is initiated, the gas valve is energized to feed gas to the nozzle tip, the electronic ignition creates a spark to the nozzle tip to ignite the gas, thereby causing a flame, the flame heats the part to the required temperature as determined by the temperature sensor, and the gas valve is then de-energized to shut off the flame.

SUMMARY OF THE INVENTION

A dual intermittent microflame system for discrete point soldering is disclosed comprising a source of combustible gas, a source of non-combustible gas, a first gas valve having first and second gas inlets and a gas outlet, a second gas valve having first and second gas inlets, and a gas outlet. Each of gas valves are movable between "off" and "on" positions. First and second gas lines connect the source of combustible gas to the first gas inlets of the first and second gas valves, respectively. A flashback arrestor is imposed in each of the first and second gas lines. Third and fourth gas lines connect the source of non-combustible gas to the second gas inlets of the first and second gas valves, respectively. The system includes a pair of spaced-apart first and second microflame nozzle tips with fifth and sixth gas lines connecting the gas outlets of the first and second gas valves to the first and second microflame nozzle tips, respectively. An ignition electrode is positioned adjacent each of the microflame nozzle tips for igniting the microflame nozzle tips. A workpiece holding apparatus is provided for positioning a workpiece adjacent the microflame nozzle tips whereby the tips are able to solder a pair of solder points.

A principal object of the invention is to provide a dual intermittent microflame system for discrete point soldering which lowers gas consumption as the flame and its gas flow are required only for the actual time the flame is heating the part.

Still another object of the invention is to provide a dual intermittent microflame system for discrete point soldering which has a lower acquisition cost as the system requires approximately 75% less components than the conventional rotary actuator systems.

Still another object of the invention is to provide a dual intermittent microflame system for discrete point soldering which has lower operating costs than the prior art devices and which is more reliable and accurate than the conventional rotary actuator systems of the prior art.

Yet another object of the invention is to provide a dual intermittent microflame system for discrete point soldering which provides improved part production quality as the closed loop IMF system controls the process based on the actual heat of the part, not the time that it should have taken to achieve the optimal temperature, thereby eliminating the variability caused by ambient conditions, part size and fit variations, machine fixture conditions, operator setup, etc.

Still another object of the invention is to provide a dual intermittent microflame system which provides improved safety due to the elimination of the flashback condition when the electrical gas valve is de-energized to cut off the combustible gas supply to the microflame nozzle tip to extinguish the flame.

Still another object of the invention is to provide a compact and portable dual intermittent microflame system for discrete point soldering.

These and other objects will be apparent to those skilled in the art.

DESCRIPTION OF THE PREFERRED EMBODIMENT

Figure 1:
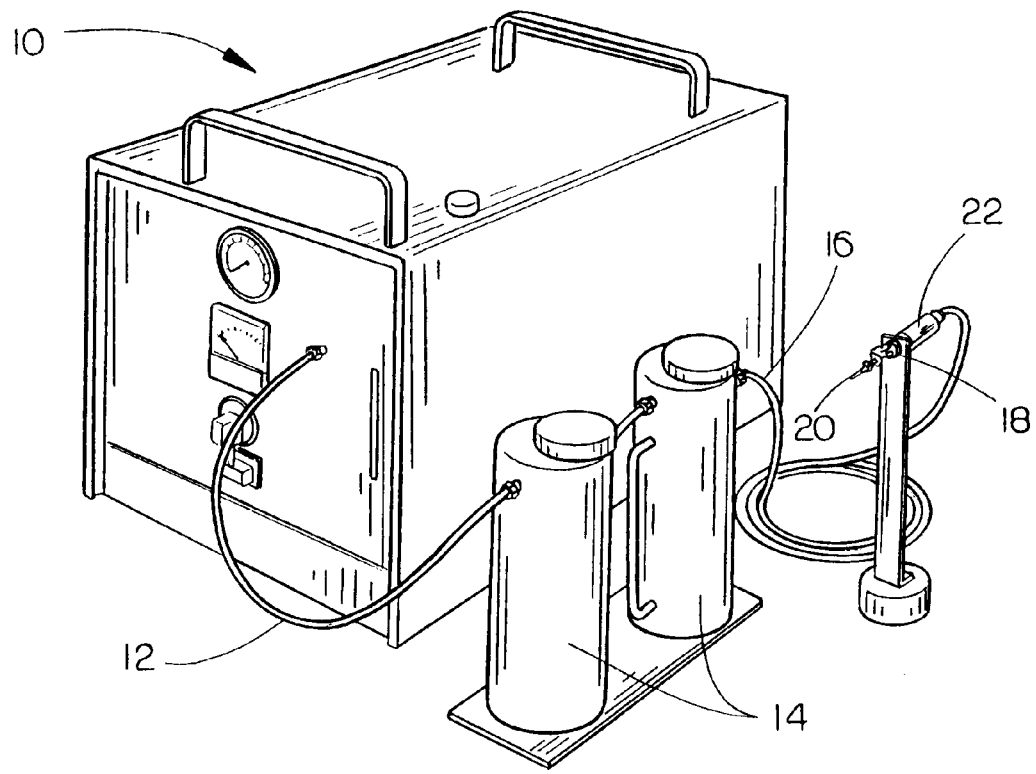
FIG. 1 is a perspective view of a prior art microflame system.
Figure 2:
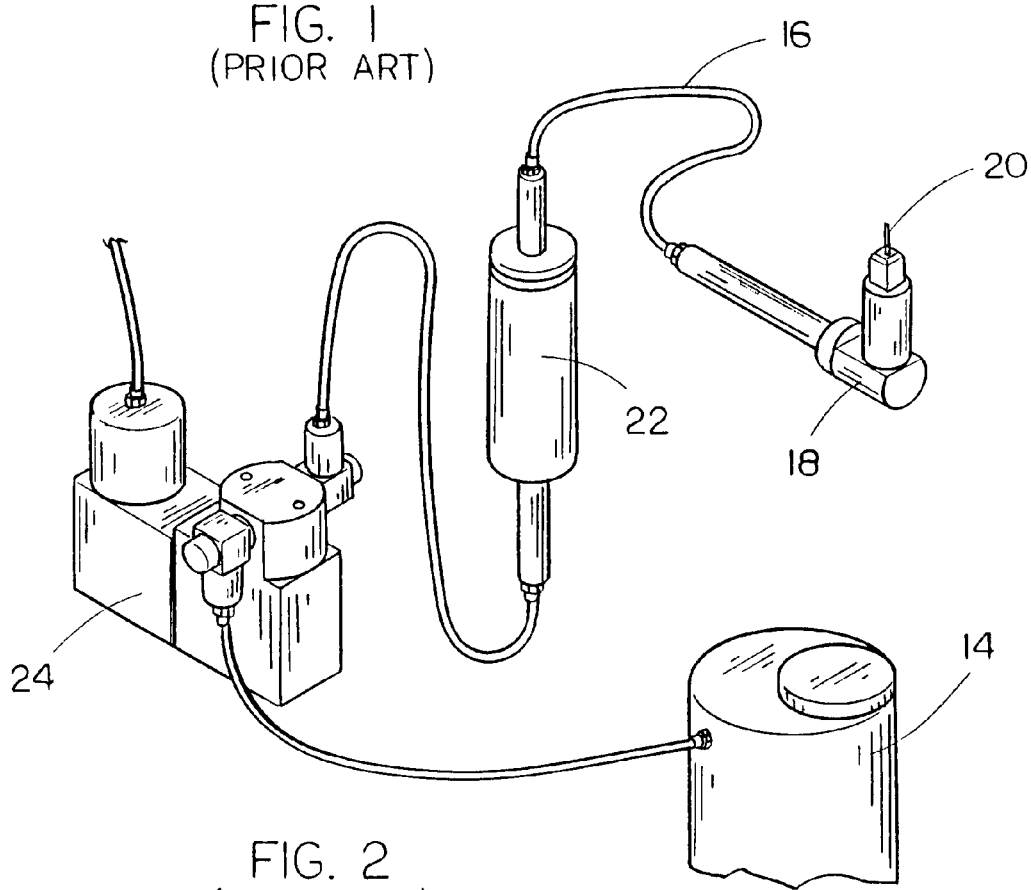
FIG. 2 is a perspective view of a prior art flashback system for use with the prior art device of FIG. 1.

FIGS. 1 and 2 illustrate prior art devices. In FIG. 1, the numeral 10 refers to a combustible gas generator having a combustible gas supply line 12 extending therefrom to one or more canisters 14 having a fuel supply line 16 extending therefrom to a torch handle 18 having a flame nozzle tip 20. Normally, a flashback arrestor 22 is provided in the supply line which extends from gas valve 24 which is in communication with the canisters 14. Flashback is a problem with the configuration illustrated in FIG. 2 when the electrical gas valve 24 is de-energized to shut off the gas supply and extinguish the flame. This causes the loss of gas pressure as it exits the open flame nozzle tip 20. The flashback is initiated from the flame nozzle tip 20 when the external flame travels back into the gas supply hose 16. The flashback is arrested by the flashback protection device 22 to prevent ignition of the combustible gas supply. However, the noise of the explosion, similar to a small caliber gunshot, and the reassembly of the gas supply hose 16 is an annoyance. In addition, the flashback protection device 22 must be periodically replaced, as the flashback explosions can damage the same. A further problem with the configuration of FIG. 2 is that the electrical gas valve 24 is located between the combustible gas supply 14 and the flashback protection device 22 inasmuch as the electrical gas valve 24 is a potential ignition source of the combustible gas supply and there is nothing to prevent the flashback to reach the combustible gas supply.

Figure 3:
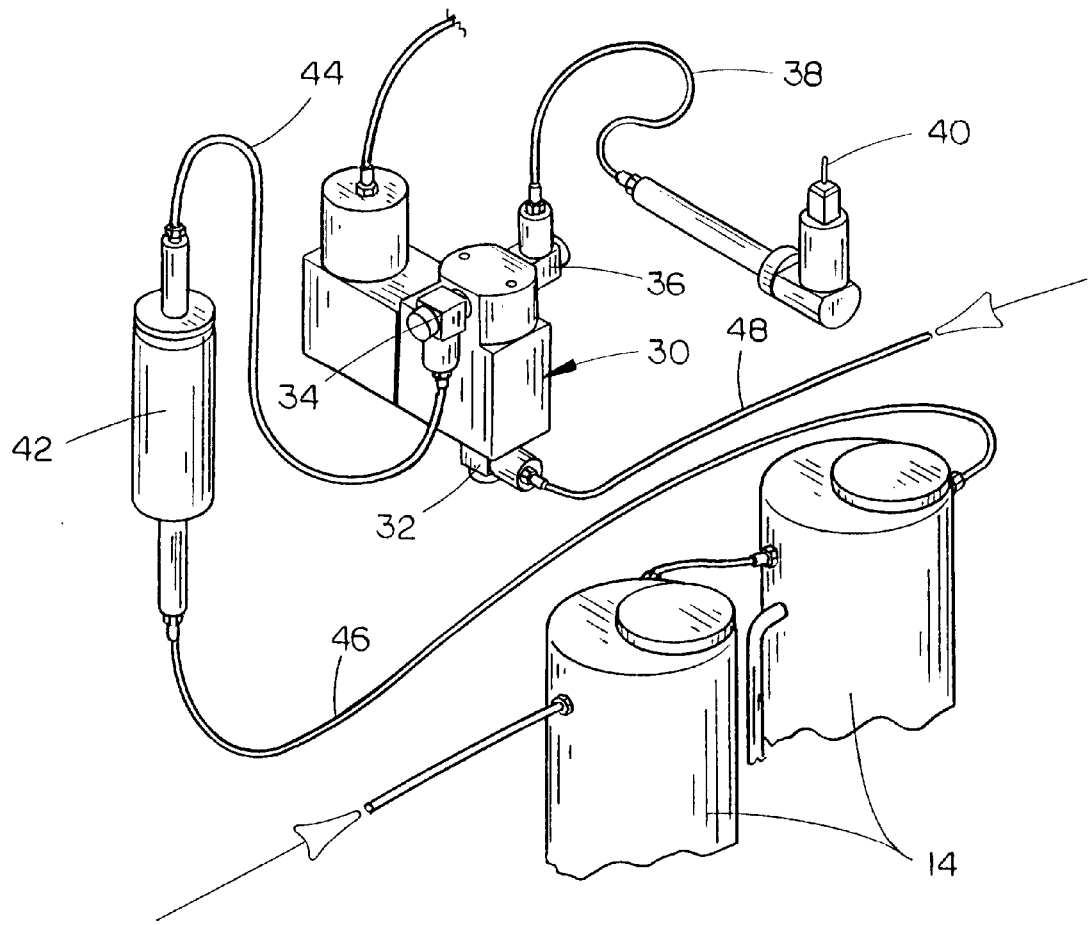
FIG. 3 is a perspective view illustrating the positive flow purge system of this invention.
Figure 4A:
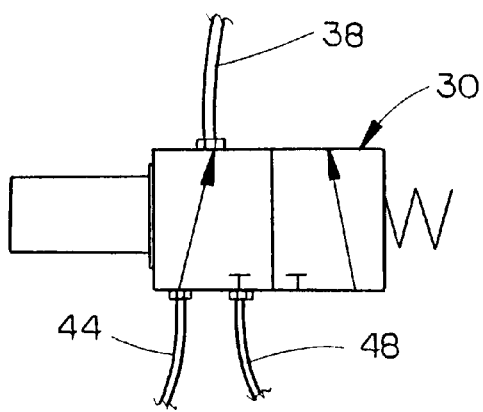
FIG. 4A is a schematic illustrating the gas valve in its "on" position.
Figure 4B:
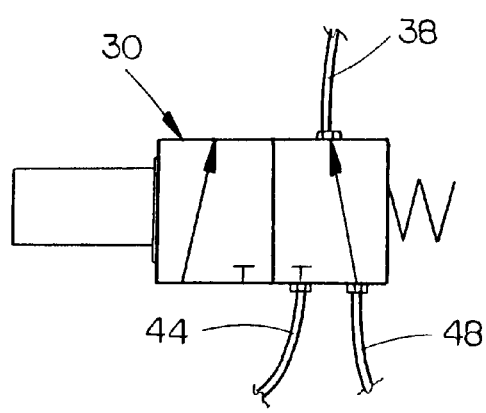
FIG. 4B is a schematic illustrating the gas valve in its "off" position.
Figure 5:
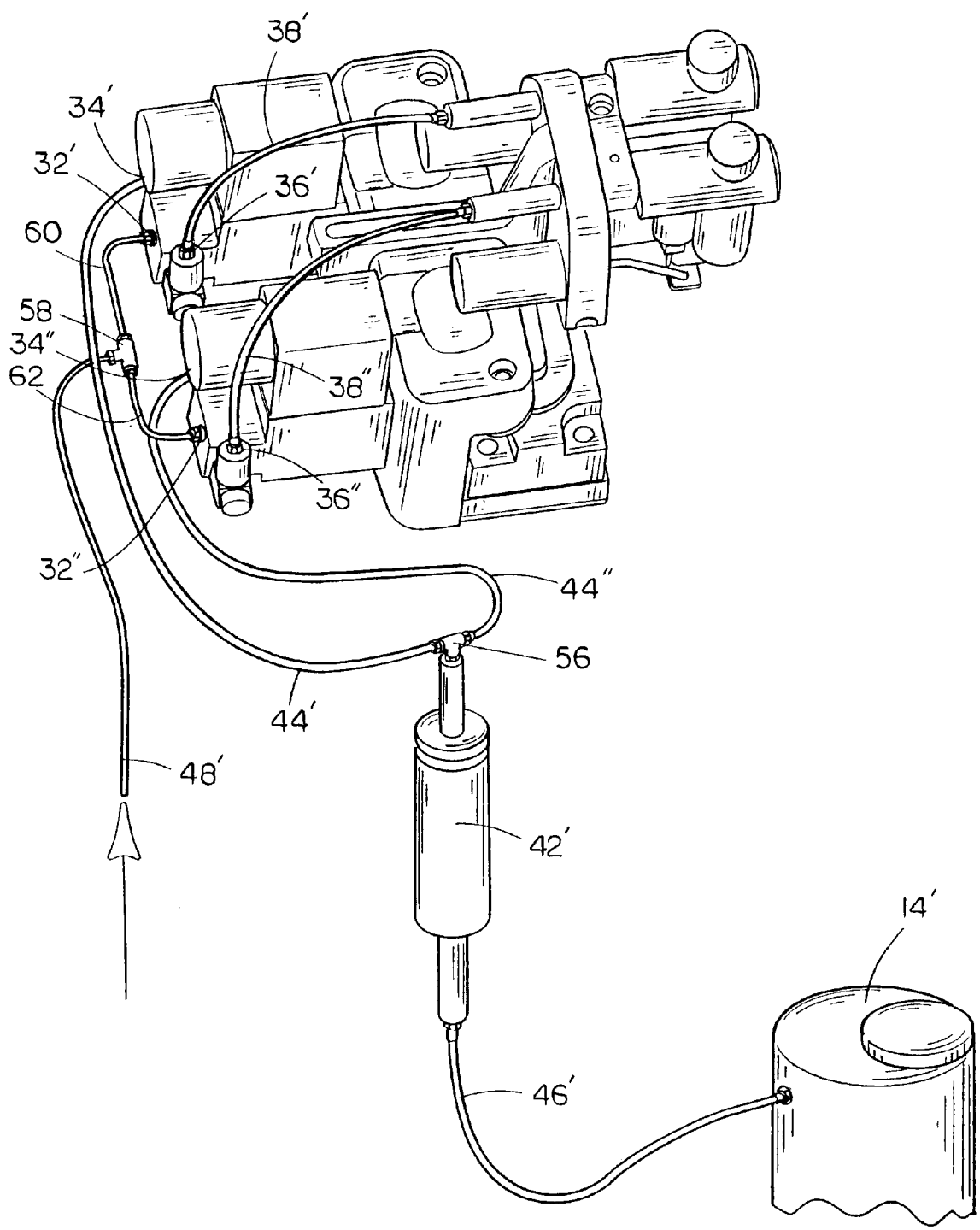
FIG. 5 is a perspective view of the dual intermittent microflame system of this invention.
Figure 6:
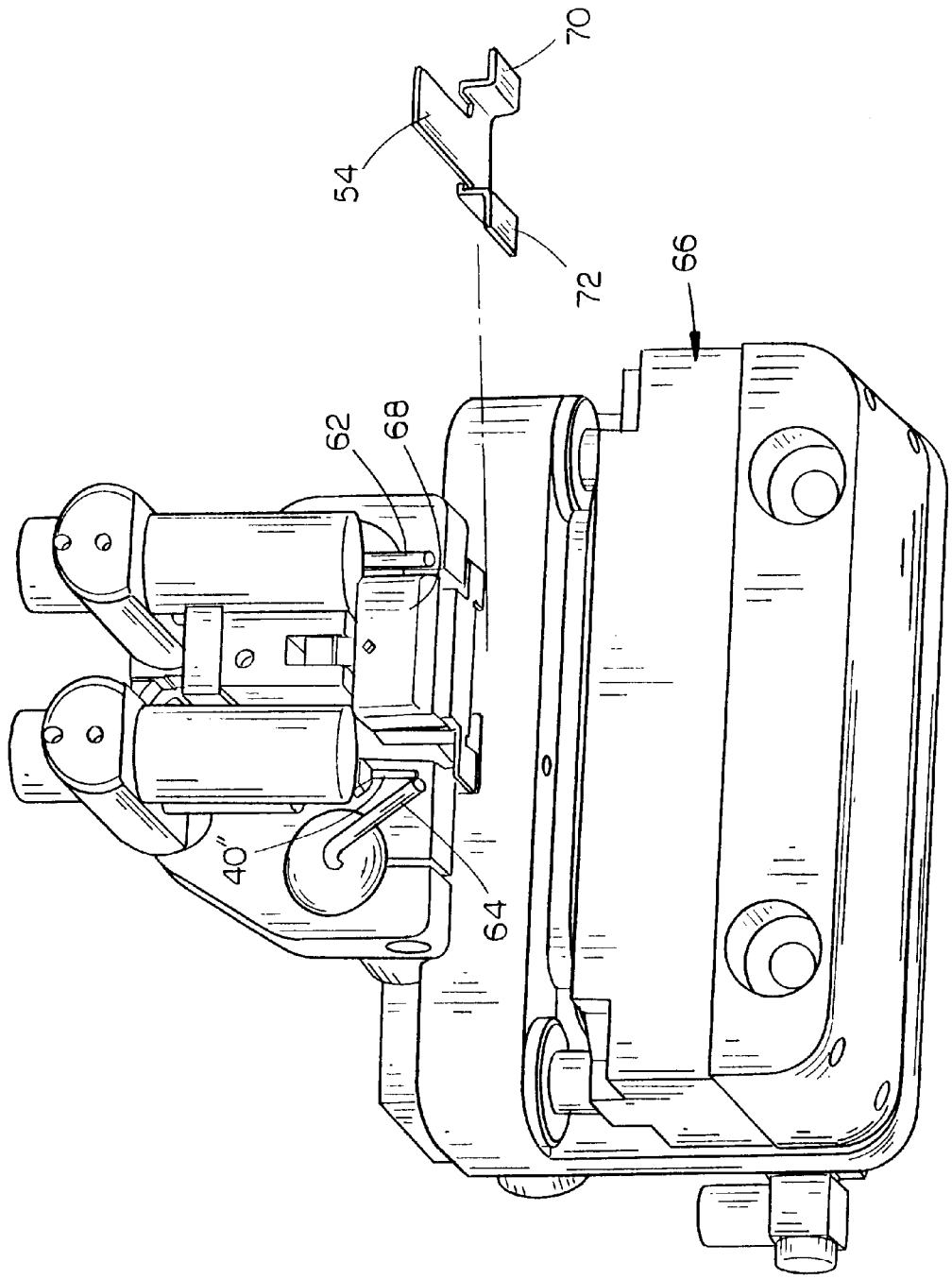
FIG. 6 is a perspective view of the system illustrating a part to be soldered and its relationship thereto.

The positive flow purge system for use with the dual intermittent microflame system of this invention is illustrated in FIGS. 3, 4A and 4B. The positive flow purge system of FIGS. 1–4 is also described in my co-pending patent application entitled "POSITIVE FLOW PURGE SYSTEM FOR MICROFLAME TORCH". In FIG. 3, the numeral 30 refers to a two-position, three-port, electrical gas control valve having gas inlets 32 and 34 and gas outlet 36. Supply line 38 extends from gas outlet 36 to the flame nozzle tip 40. The numeral 42 refers to a conventional flashback protection device or arrestor, such as illustrated in FIG. 2, but which is positioned at the upstream side of the gas control valve 30 and which is connected to the gas inlet 34 by supply hose 44. The inlet end of flashback protection device 42 is connected to the canisters 14 which are connected in series and which are connected to the combustible gas generator by hose 46.

Gas inlet 32 is connected to a source of low pressure, noncombustible gas such as compressed air by means of supply hose 48.

FIGS. 4A and 4B schematically represent the "on" and "off" positions of the valve 30. When the valve 38 is in the "on" position, as illustrated in FIG. 4A, the combustible gas is supplied to the flame nozzle tip 40 by means of the hose or supply line 38. When in the position of FIG. 4A, the non-combustible gas is routed to the flame tip by the open valve port which permits the non-combustible gas to flow continuously to the flame nozzle tip 40 which is connected to the exit port of the valve, thereby causing the flame to be extinguished when the gas valve is de-energized so that flashback into the supply hose 38 is prevented, due to the flow of non-combustible gas through the flame nozzle tip 40. The positive flow purge system of this invention eliminates flashbacks within the gas supply hoses and its potential ignition of the combustible gas supply by maintaining the pressure within the gas supply hoses with a non-combustible gas, thereby preventing flashback within the gas supply hoses when the gas valve is de-energized to extinguish the flame. The positive flow purge system of this invention improves the safety of microflame technology and its commercial application by reducing the risk of flashbacks.

Figure 7:
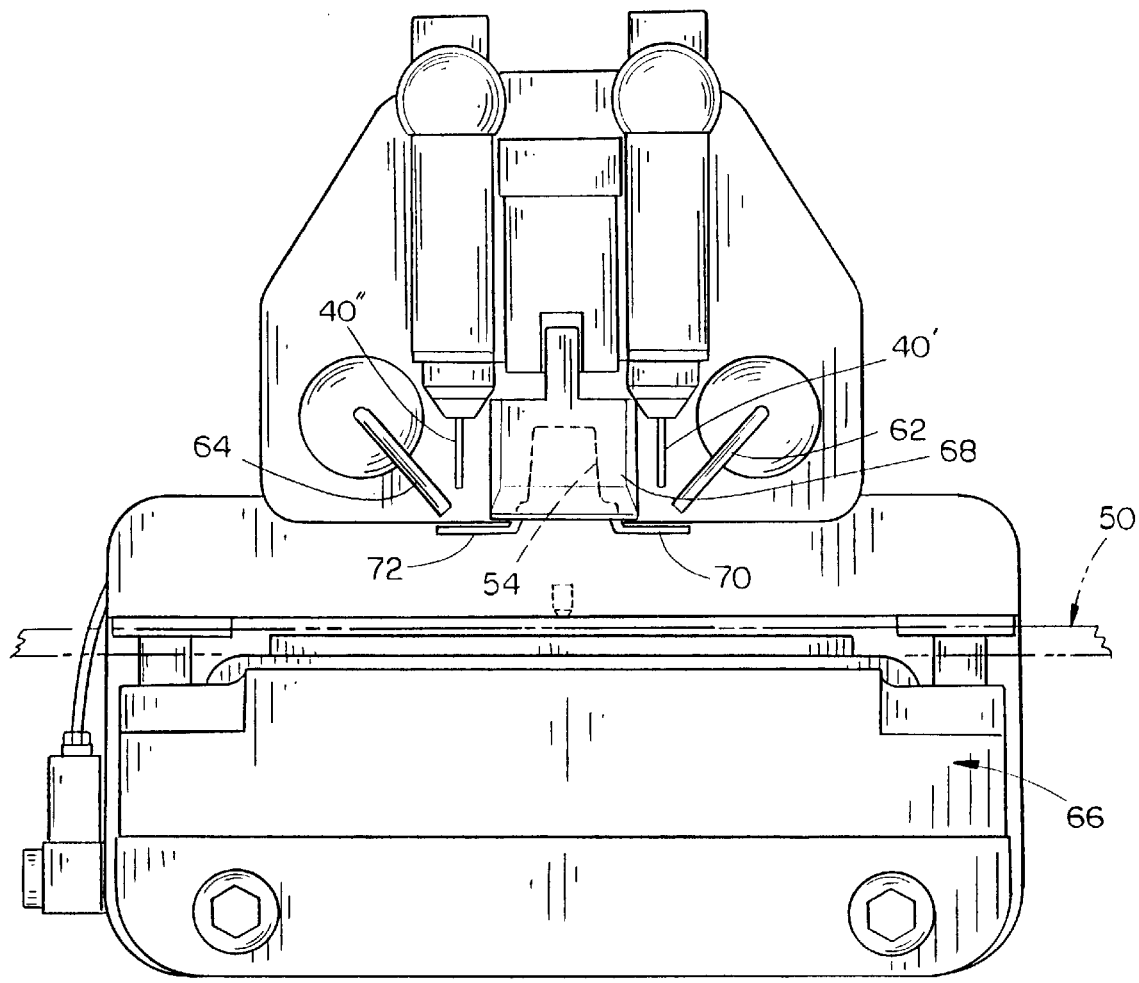
FIG. 7 is a view of the system of this invention showing the part to be soldered placed into the system.
Figure 8:
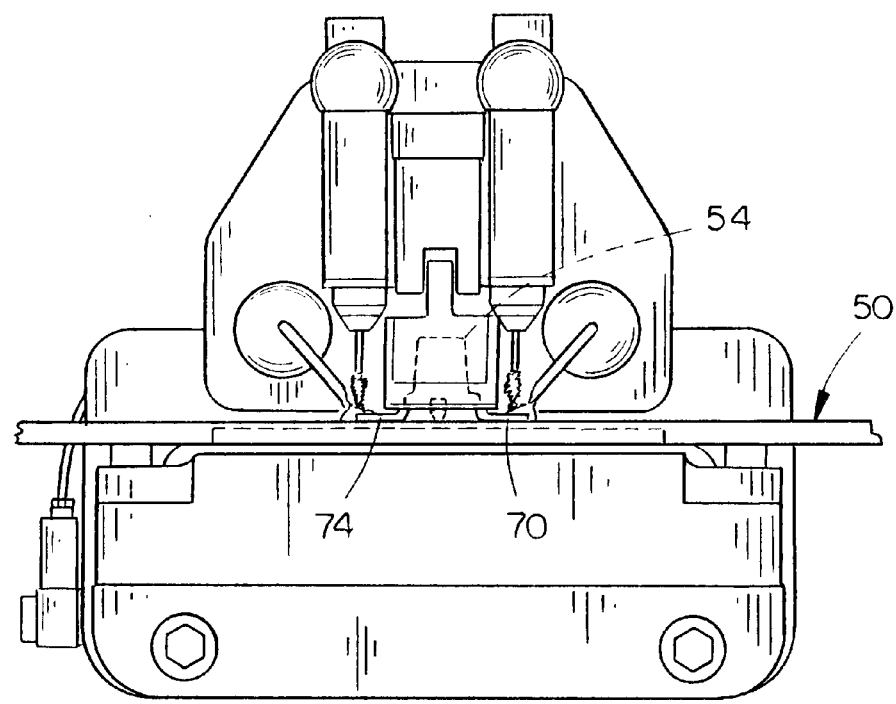
FIG. 8 is a view similar to FIG. 7 except that the part holding portion of the invention has been lowered into engagement with the back glass.
Figure 9:
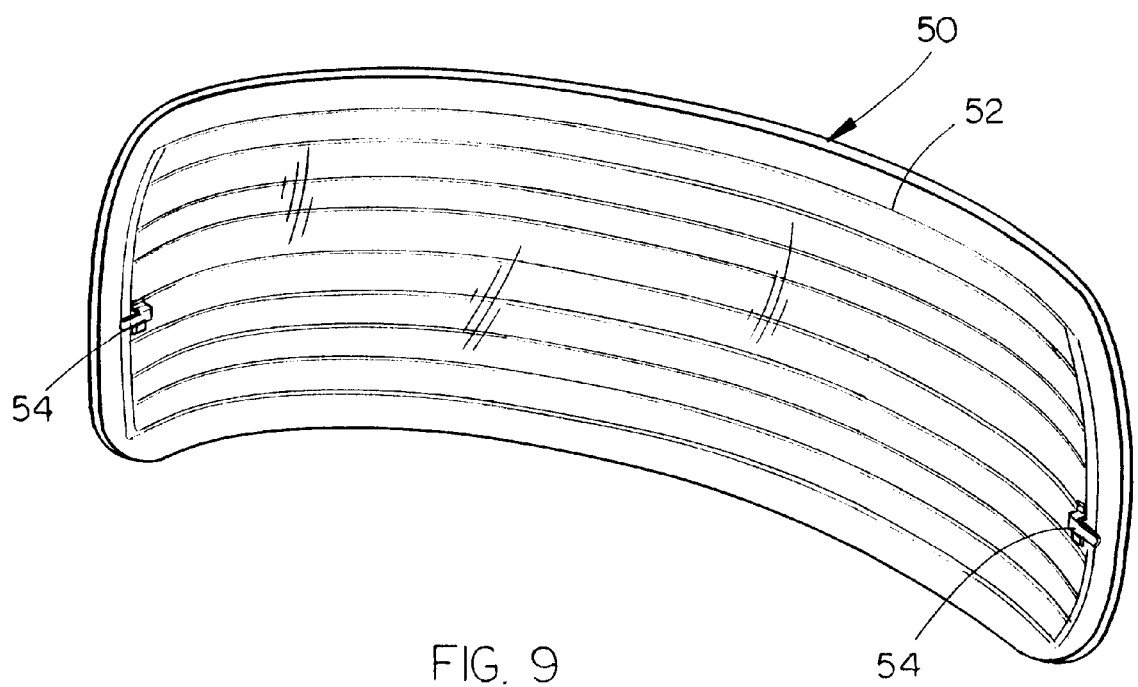
FIG. 9 is a perspective view of a back glass having a pair of parts soldered thereto.

FIGS. 5–8 illustrate a dual intermittent microflame system for discretely soldering a pair of solder points such as is required on a vehicle back glass 50 having heating wires 52 embedded therein or placed thereon. As seen in FIG. 9, a pair of terminals 54 are provided at opposite ends of the back glass 50 with each of the terminals 54 having a pair of connectors which are soldered to a pair of leads or wires, respectively. The dual intermittent microflame system of this invention is suited for soldering the terminals 54 to the back glass 50. In FIGS. 5–8, the numeral 14' refers to a canister, such as illustrated in FIGS. 1 and 2, and having fuel line 46' extending therefrom to the flashback protection device or flashback arrestor 42'. Flashback protective device 42' is provided with a T-connector 56 having gas hoses 44' and 44" extending therefrom to the gas inlets 34' and 34" on the gas valves 30' and 30", respectively. Gas line 48' is connected to the source of non-combustible fuel and has a T-connector 58 connected thereto from which extends gas lines 60 and 62. Gas lines 60 and 62 are connected to the gas inlets 32' and 32", respectively. Gas lines 38' and 38" extend from gas outlets 36' and 36" to the microflame nozzle tips 40' and 40". Conventional igniter electrodes 62 and 64 are provided for igniting the flame tips. The numeral 66 refers generally to a workpiece holding apparatus for supporting the back glass 50 thereon below the terminal holding apparatus 68, which is adapted to receive and support the terminal 54 therein so that the terminal contacts 70 and 72 of the terminal 54 are positioned above the back glass 50, as illustrated in FIG. 7. After the back glass 50 has been positioned on the workpiece holding apparatus 66 in the manner illustrated in FIG. 7, the workpiece holding apparatus 66 is moved vertically with respect to the terminal contacts 70 and 72 to bring the terminal contacts 70 and 72 into contact with a pair of wires or heating elements at one end of the back glass 50. The control system for the apparatus is then operated to ignite the flame nozzle tips 40' and 40" to solder the terminal contacts 70 and 72 to the wires or heating elements at one end of the back glass 50. When the soldering operation has been performed, the flames at the tips 40' and 40" are extinguished and the workpiece holding apparatus 66 is lowered with the terminal 54 being pulled from the holding apparatus 68. The back glass 50 is then manipulated so that the other end of the back glass is properly positioned on the workpiece holding apparatus 66. A second terminal 54 is the inserted into the holding apparatus 68 and the procedure is repeated.

Although the system of this invention is ideally suited for dual discrete point soldering, the system is well-suited for single discrete point soldering or multiple discrete points soldering. Further, the system of this invention could also be used with only combustible gas, however, the use of both combustible and non-combustible gases is preferred.

Thus it can be seen that the invention accomplishes at least all of its stated objectives.

I claim:

1. A dual intermittent microflame system for discrete point soldering, comprising:

a source of combustible gas;

a source of non-combustible gas;

a first gas valve having first and second gas inlets and a gas outlet;

a second gas valve having first and second gas inlets and a gas outlet;

each of said gas valves being movable between "off" and "on" positions;

first and second gas lines connecting said source of combustible gas to said first gas inlets of said first and second gas valves, respectively;

a flashback arrestor imposed in said first and second gas lines;

third and fourth gas lines connecting said source of non-combustible gas to said second gas inlets of said first and second gas valves, respectively;

spaced-apart first and second microflame nozzle tips;

fifth and sixth gas lines connecting said gas outlets of said first and second gas valves to said first and second microflame nozzle tips, respectively;

an ignition electrode positioned adjacent each of said microflame nozzle tips for igniting said microflame nozzle tips;

and a workpiece holding apparatus for positioning a workpiece adjacent said microflame nozzle tips whereby said tips are able to solder a pair of solder points.

2. A dual intermittent microflame system for discrete point soldering, comprising:

a source of combustible gas;

a source of non-combustible gas;

a first gas valve having first and second gas inlets and a gas outlet;

a second gas valve having first and second gas inlets and a gas outlet;

each of said gas valves being movable between "off" and "on" positions;

first and second gas lines connecting said source of combustible gas to said first gas inlets of said first and second gas valves, respectively;

third and fourth gas lines connecting said source of non-combustible gas to said second gas inlets of said first and second gas valves, respectively;

spaced-apart first and second microflame nozzle tips;

fifth and sixth gas lines connecting said gas outlets of said first and second gas valves to said first and second microflame nozzle tips, respectively;

an ignition electrode positioned adjacent each of said microflame nozzle tips for igniting said microflame nozzle tips;

a flashback arrestor imposed between said microflame nozzle tips and said source of combustible gas;

and a workpiece holding apparatus for positioning a workpiece adjacent said microflame nozzle tips whereby said tips are able to solder a pair of solder points.

3. An intermittent microflame system for discrete point soldering, comprising:

a source of combustible gas;

a source of non-combustible gas;

a first gas valve having first and second gas inlets and a gas outlet;

said gas valve being movable between "off" and "on" positions;

a first gas line connecting said source of combustible gas to said first gas inlet of said first gas valve;

a flashback arrestor imposed in said first gas line;

a second gas line connecting said source of non-combustible gas to said second gas inlet of said first gas valve;

a first microflame nozzle tip;

a third gas line connecting said gas outlet of said first gas valve to said first microflame nozzle tip;

an ignition electrode positioned adjacent said microflame nozzle tip for igniting said microflame nozzle tip;

and a workpiece holding apparatus for positioning a workpiece adjacent said microflame nozzle tip whereby said tip is able to solder a solder point.

4. The system of claim 3 wherein a plurality of spaced-apart microflame nozzle tips are provided for soldering a plurality of solder points, respectively.

5. An intermittent microflame system for discrete point soldering, comprising:

a source of combustible gas;

a first gas valve having a gas inlet and a gas outlet;

said gas valve being movable between "off" and "on" positions;

a first gas line connecting said source of combustible gas to said gas inlet of said first gas valve;

a microflame nozzle tip;

a second gas line connecting said gas outlet of said gas valve to said microflame nozzle tip;

an ignition electrode positioned adjacent said microflame nozzle tip for igniting said microflame nozzle tip;

a flashback arrestor imposed between said microflame nozzle tip and said source of combustible gas;

and a workpiece holding apparatus for positioning a workpiece adjacent said microflame nozzle tip whereby said tip is able to solder a solder point.

6. The system of claim 5 wherein a plurality of spaced-apart microflame nozzle tips are provided for soldering a plurality of solder points, respectively.

7. The system of claim 5 wherein combustible and non-combustible gas is supplied to said nozzle tip.

* * * * *